US010187006B2

(12) United States Patent
Almy et al.

(10) Patent No.: US 10,187,006 B2
(45) Date of Patent: Jan. 22, 2019

(54) WEDGE SPRING CLIP MOUNTING SYSTEM FOR PHOTOVOLTAIC MODULES

(71) Applicant: SolarCity Corporation, San Mateo, CA (US)

(72) Inventors: Charles Almy, Berkeley, CA (US); Tyrus Hudson, San Rafael, CA (US); David Molina, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 78 days.

(21) Appl. No.: 14/800,681

(22) Filed: Jul. 15, 2015

(65) Prior Publication Data
US 2017/0019057 A1    Jan. 19, 2017

(51) Int. Cl.
*H02S 20/23* (2014.01)
*F24J 2/52* (2006.01)
*F24J 2/46* (2006.01)

(52) U.S. Cl.
CPC ............... *H02S 20/23* (2014.12); *F24J 2/52* (2013.01); *F24J 2002/4658* (2013.01); *Y02B 10/12* (2013.01)

(58) Field of Classification Search
CPC  F24J 2/5203; F24J 2/5256; F24J 2/526; F24J 2/5258; F24J 2/5207; F24J 2/5209; F24J 2002/5226; F24J 2002/4665; F24J 2002/5215; H01R 25/142; Y02E 10/47; F24S 30/425
USPC ...... 52/24–26, 173.3, 489.1, 489.2; 403/321, 403/322.4; 248/221.11, 222.13, 680, 248/205.3, 500, 311.2, 312.1, 313, 316.1,
(Continued)

(56) References Cited

U.S. PATENT DOCUMENTS 3,088,702 A   5/1963  Orenick
3,100,922 A   8/1963  Burniston
(Continued)

FOREIGN PATENT DOCUMENTS

DE   200 11 063 U1   9/2000
DE   103 10 457 A1   9/2004
(Continued)

OTHER PUBLICATIONS

International Search Report, dated Dec. 23, 2016, for International Patent Application, PCT/US2016/041476, 6 pages.
(Continued)

*Primary Examiner* — Joshua J Michener
*Assistant Examiner* — Keith Minter
(74) *Attorney, Agent, or Firm* — Kilpatrick Townsend & Stockton LLP

(57) ABSTRACT

A photovoltaic (PV) mounting system having a base portion that is substantially planar and having a first roof-facing side and an opposite module-facing side. The base portion has a lip that circumscribes the perimeter of the base portion and curves inward on the module-facing side. A clamp having a spring base is partially installed in the base portion and has a pair of clamping flanges extending upwardly from the base portion. A support beam comprising a pair of ledges adapted to mate with the clamping flanges of the clamp and a bottom portion that is supported by the spring base. A PV module coupling device is mechanically coupled to the support beam and configured for coupling to the frames of at least two photovoltaic modules.

19 Claims, 7 Drawing Sheets

(58) Field of Classification Search
USPC ............... 248/346.5, 510, 310, 316.7, 228.7,
248/229.16, 229.26; 126/600, 696
See application file for complete search history.

(56) References Cited

U.S. PATENT DOCUMENTS

| | | | |
|---|---|---|---|
| 3,987,992 A * | 10/1976 | Foflygen | H02G 3/10 |
| | | | 248/205.1 |
| 4,061,299 A | 12/1977 | Kurosaki | |
| 4,264,047 A | 4/1981 | Nelson | |
| 5,070,666 A * | 12/1991 | Looman | A47G 5/00 |
| | | | 52/135 |
| 5,494,245 A | 2/1996 | Suzuki et al. | |
| 5,557,903 A * | 9/1996 | Haddock | E04D 3/3607 |
| | | | 52/408 |
| 5,971,663 A | 10/1999 | Brothers | |
| 6,164,603 A | 12/2000 | Kawai | |
| 6,672,018 B2 | 1/2004 | Shingleton | |
| 6,875,914 B2 * | 4/2005 | Guha | H01L 31/02008 |
| | | | 136/244 |
| 6,948,687 B2 | 9/2005 | Shatzky | |
| 7,780,472 B2 * | 8/2010 | Lenox | F24J 2/5211 |
| | | | 136/251 |
| 7,784,745 B2 | 8/2010 | Dodge | |
| 8,122,648 B1 | 2/2012 | Liu | |
| 8,176,693 B2 | 5/2012 | Abbott et al. | |
| 8,245,460 B2 * | 8/2012 | Yamanaka | F24J 2/4614 |
| | | | 126/623 |
| 8,250,829 B2 | 8/2012 | McPheeters et al. | |
| 8,341,917 B2 | 1/2013 | Resso et al. | |
| 8,413,944 B2 | 4/2013 | Harberts et al. | |
| 8,590,223 B2 | 11/2013 | Kilgore et al. | |
| 8,661,765 B2 | 3/2014 | Schaefer et al. | |
| 8,733,718 B2 | 5/2014 | Corsi | |
| 8,740,163 B1 | 6/2014 | Taylor et al. | |
| 8,752,338 B2 | 6/2014 | Schaefer et al. | |
| 8,756,881 B2 | 6/2014 | West et al. | |
| 8,801,349 B2 | 8/2014 | McPheeters | |
| 8,839,573 B2 * | 9/2014 | Cusson | F24J 2/5232 |
| | | | 248/231.81 |
| 8,904,718 B2 | 12/2014 | Schick et al. | |
| 8,935,893 B2 | 1/2015 | Liu et al. | |
| 8,936,224 B2 | 1/2015 | Bartelt-Muszynski et al. | |
| 8,984,818 B2 | 3/2015 | McPheeters et al. | |
| 9,531,319 B2 * | 12/2016 | Braunstein | H02S 20/23 |
| 9,793,852 B2 * | 10/2017 | Almy | H02S 20/23 |
| 2003/0089828 A1 * | 5/2003 | Korczak | F16B 21/075 |
| | | | 248/68.1 |
| 2010/0269447 A1 | 10/2010 | Schuit et al. | |
| 2010/0276558 A1 * | 11/2010 | Faust | F24J 2/5205 |
| | | | 248/222.14 |
| 2011/0138585 A1 * | 6/2011 | Kmita | F24J 2/5258 |
| | | | 24/522 |
| 2011/0192098 A1 | 8/2011 | Chung | |
| 2011/0253190 A1 | 10/2011 | Farnham, Jr. | |
| 2011/0260027 A1 | 10/2011 | Farnham, Jr. | |
| 2011/0277296 A1 | 11/2011 | Ramos | |
| 2012/0138764 A1 * | 6/2012 | Kemple | F24J 2/465 |
| | | | 248/316.1 |
| 2012/0304556 A1 * | 12/2012 | Teller | E04D 13/10 |
| | | | 52/173.1 |
| 2013/0098223 A1 * | 4/2013 | Coady | F16B 5/0266 |
| | | | 84/421 |
| 2013/0133270 A1 | 5/2013 | West | |
| 2013/0193301 A1 * | 8/2013 | Jackson | F24J 2/5241 |
| | | | 248/676 |
| 2013/0320166 A1 * | 12/2013 | Kemple | F24J 2/52 |
| | | | 248/220.22 |
| 2014/0003861 A1 * | 1/2014 | Cheung | F24J 2/5256 |
| | | | 403/291 |
| 2014/0060724 A1 * | 3/2014 | Amato | A47B 91/024 |
| | | | 156/92 |
| 2015/0129517 A1 * | 5/2015 | Wildes | F24J 2/5245 |
| | | | 211/41.1 |
| 2015/0155823 A1 | 6/2015 | West et al. | |
| 2015/0311854 A1 * | 10/2015 | Goehringer | H02S 20/00 |
| | | | 211/41.1 |

FOREIGN PATENT DOCUMENTS

| | | |
|---|---|---|
| DE | 202009012870 U1 | 1/2010 |
| DE | 10 2010 020218 A1 | 11/2011 |
| DE | 202013002857 U1 | 5/2013 |
| WO | 2003/001069 A1 | 1/2003 |
| WO | 2006/094609 A1 | 9/2006 |
| WO | 2013/092905 A1 | 6/2013 |
| WO | 2013/110456 A2 | 8/2013 |
| WO | 2014/169396 A1 | 10/2014 |

OTHER PUBLICATIONS

Written Opinion, dated Dec. 23, 2016, for International Patent Application, PCT/US2016/041476, 8 pages.

International Preliminary Report on Patentability dated Jan. 25, 2018 for International Application No. PCT/US2016/041476. 10 pages.

* cited by examiner

WEDGE SPRING CLIP MOUNTING SYSTEM
FOR PHOTOVOLTAIC MODULES

CROSS REFERENCE TO RELATED APPLICATIONS

This application is related to co-assigned and co-invented U.S. patent application Ser. No. 14/800,666, entitled "Clamp and Bowl Mounting System for Photovoltaic Modules," filed on Jul. 15, 2015, which is incorporated by reference herein.

BACKGROUND OF THE INVENTION

There are many systems available for mounting photovoltaic (PV) modules to building structures, such as a roof. These systems serve as a rigid interconnection element between a roof and a PV module to hold the modules in place and resist the forces of gravity and wind.

Traditionally, mounting systems consisted of rows of rail structures attached to the roof in columns or rows. Module clamps were used to attach the PV modules to these rail structures. Although effective, these traditional systems required complex and time-consuming installations and utilized relatively large amount of materials. Eventually, pioneers in the solar industry, such as Jack West of San Rafael-based Zep Solar, realized that module frames themselves are sufficiently rigid to function as the rails of a PV mounting system. By utilizing the inherent rigidity of modules frames as part of the PV mounting system, system part counts and costs of PV mounting systems were significantly reduced while installation time and overall aesthetics were improved. This realization caused the majority of the residential solar industry to move away from rail-based solutions. However, in order to continue the momentum of solar against other fossil fuel-based energy sources, it is imperative that both hard and soft PV costs continue to be reduced.

Most rail-free or so-called direct mount systems, rely on pillar-like PV module supports which connect to each module frame at various points around the array—typically at least four points on each module. These module supports are in turn attached to the roof, either into a roof rafter or directly to the roof deck, via a flashing. The flashing is just a flat sheet of aluminum with a preformed feature designed to mate with the module support and typically including at least one lag-bolt through-hole for securing both the flashing and the module support to the roof.

Although effective at reducing water leaks and covering missed drill holes, flashings can increase the time of installation because when they are used, the installer must complete all site preparation first before placing any of the PV modules, installing a flashing at each intended roof penetration. This bottleneck prevents an installer from installing the array row-by-row or panel-by-panel and, as a result, may slow-down the rate at which PV can be installed, may require larger installation crews, or both. Also, because each flashing gets tucked underneath the next up-roof course of shingles, it is often necessary to remove existing roofing nails to accommodate the flashings. Each time an existing roofing nail is removed, a new potential leak point is created. Finally, each flashing adds a material cost to each solar installation that becomes significant when multiplied against every roof penetration of every installed array.

Accordingly, there is a need for a rail-free PV mounting system that enjoys the benefits of existing rail-free solutions, while reducing costs, and increasing installation times relative to such systems.

BRIEF SUMMARY OF THE INVENTION

Many embodiments of the invention are related to a photovoltaic (PV) mounting system having a base portion that can be substantially planar and have a first roof-facing side and an opposite array-facing side. The base portion can include a lip that circumscribes the perimeter of the base portion and curves inward on the array facing side. A clamp having a spring base can be partially installed in the base portion and a pair of clamping flanges can extend upwardly from the base portion. A support beam having a pair of ledges can be adapted to mate with the clamping flanges of the clamp and a bottom portion that is supported by the spring base. A PV module coupling device can be mechanically coupled to the mounting member and configured for coupling to the frames of at least two photovoltaic modules.

In many embodiments, the base portion can be a circular puck having a through-hole for mounting the base portion to a structure by a lag-bolt or other mechanical fastener.

In many embodiments, the spring base of the clamp can be arched upwardly from the base portion.

In many embodiments, the spring base can be configured to flatten when the support beam is mated with the clamping flanges.

In many embodiments, the spring base can apply a spring force against the support beam and clamping flanges.

In many embodiments, the clamping flanges can form a boxed structure extending upwardly from the base portion.

In many embodiments, the clamping flanges can include teeth configured for gripping the support beam.

In many embodiments, the photovoltaic module coupling device can include clamping style connector.

In many embodiments, the photovoltaic module coupling device can include rockit connector.

Many embodiments of the invention are related to a photovoltaic (PV) mounting system having a base portion. The system can include a clamp having a spring base and a pair of clamping flanges extending upwardly from the spring base. A support beam configured as a mount for a PV module coupling device can also be provided. The support beam can be configured to forcibly fit between the clamping flanges of the clamp and resiliently deform the spring base to lock it into the base portion.

In many embodiments, the base portion can be a circular puck adapted to mount to a structure via a lag bolt or other mechanical fastener.

In many embodiments, the base portion can include a lip that the spring base forcibly locks within.

In many embodiments, the clamp can comprise a spring base and a pair of clamping flanges.

In many embodiments, the pair of clamping flanges can form a boxed structure for holding the support beam.

In many embodiments, the pair of clamping flanges can be a pair of ledges configured to maintain the support beam in position to resiliently deform the spring base.

In many embodiments, the pair of clamping flanges can have teeth for engaging the support beam.

In many embodiments, the support beam can be an elongated boxed beam.

Many embodiments of the invention are related to a photovoltaic (PV) mounting system having a base portion. A clamp having a lower-most base formed as a spring can be in contact with the base portion. The system can include a support beam configured as a mount for a PV module coupling device. The support beam can be further configured to be held within the clamp and lock the clamp base to the base portion without the use of bolts or other mechanical fasteners.

In many embodiments, the clamp can include flanges that extend upwardly from the clamp base.

In many embodiments, the lower most base can be an arch.

In many embodiments, the arch can be flattened by the support beam when the lower most base is locked to the base portion.

In many embodiments, the clamp can include retaining portions for maintaining resilient compression of the arch.

DETAILED DESCRIPTION OF THE INVENTION

Embodiments of the invention are generally directed towards a system for mounting a PV module to a support structure such as a roof surface. The system can include a base portion and a clamp assembly for supporting a PV module. The clamp assembly may include a spring clamp that when resiliently actuated with the base portion assembly, provides a boltless system for rigidly fixing the clamp assembly to the base portion in a sufficient manner to support the weight of one or more PV modules. Advantageously, such a system requires little to no tools for installation, and hence installation time is greatly reduced over prior systems that require additional tools and bolting. The following description details some examples of such a system.

Figure 1A:
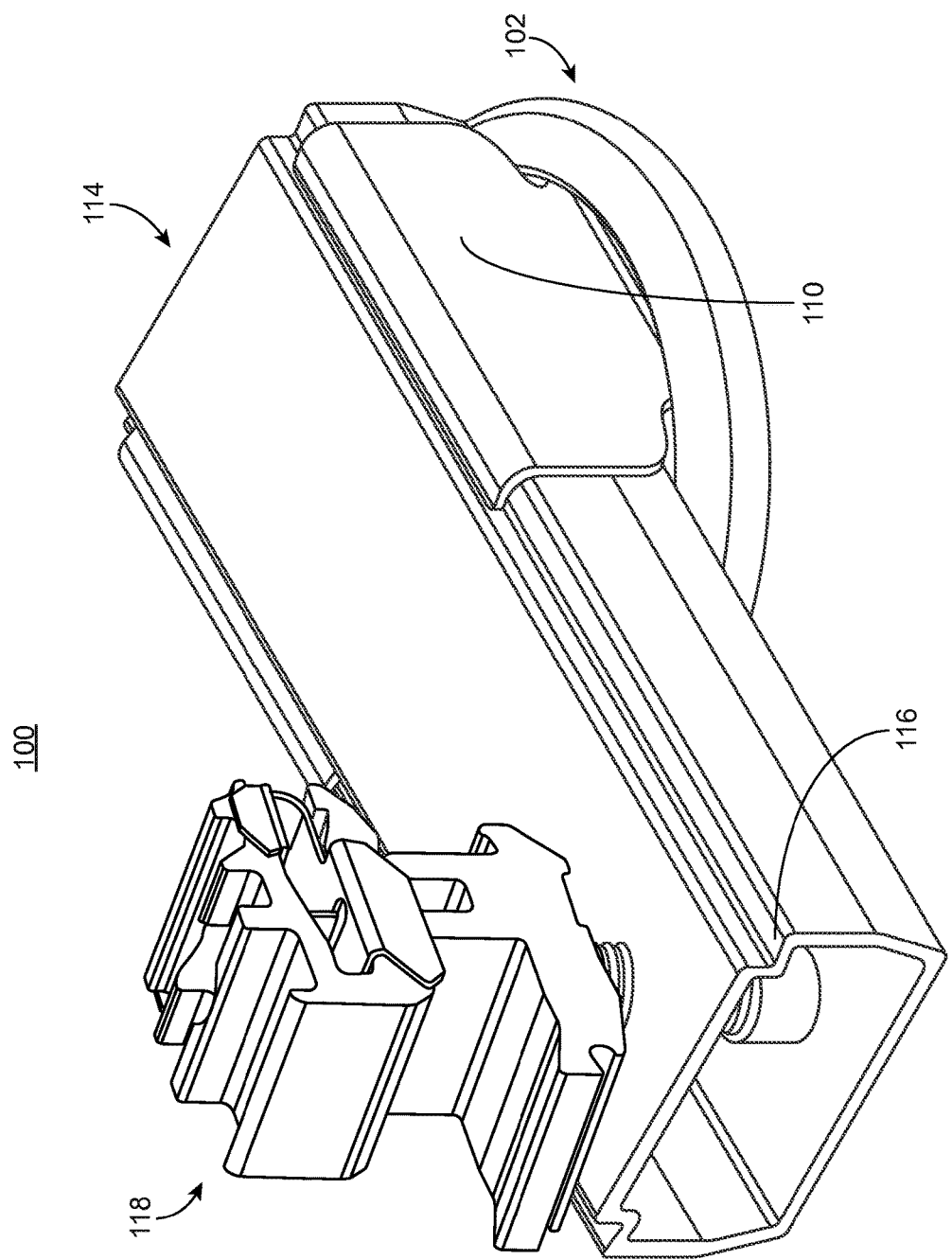
FIGS. 1A and 1B show perspective views of an exemplary PV mounting system, according to an embodiment of the invention.
Figure 1B:
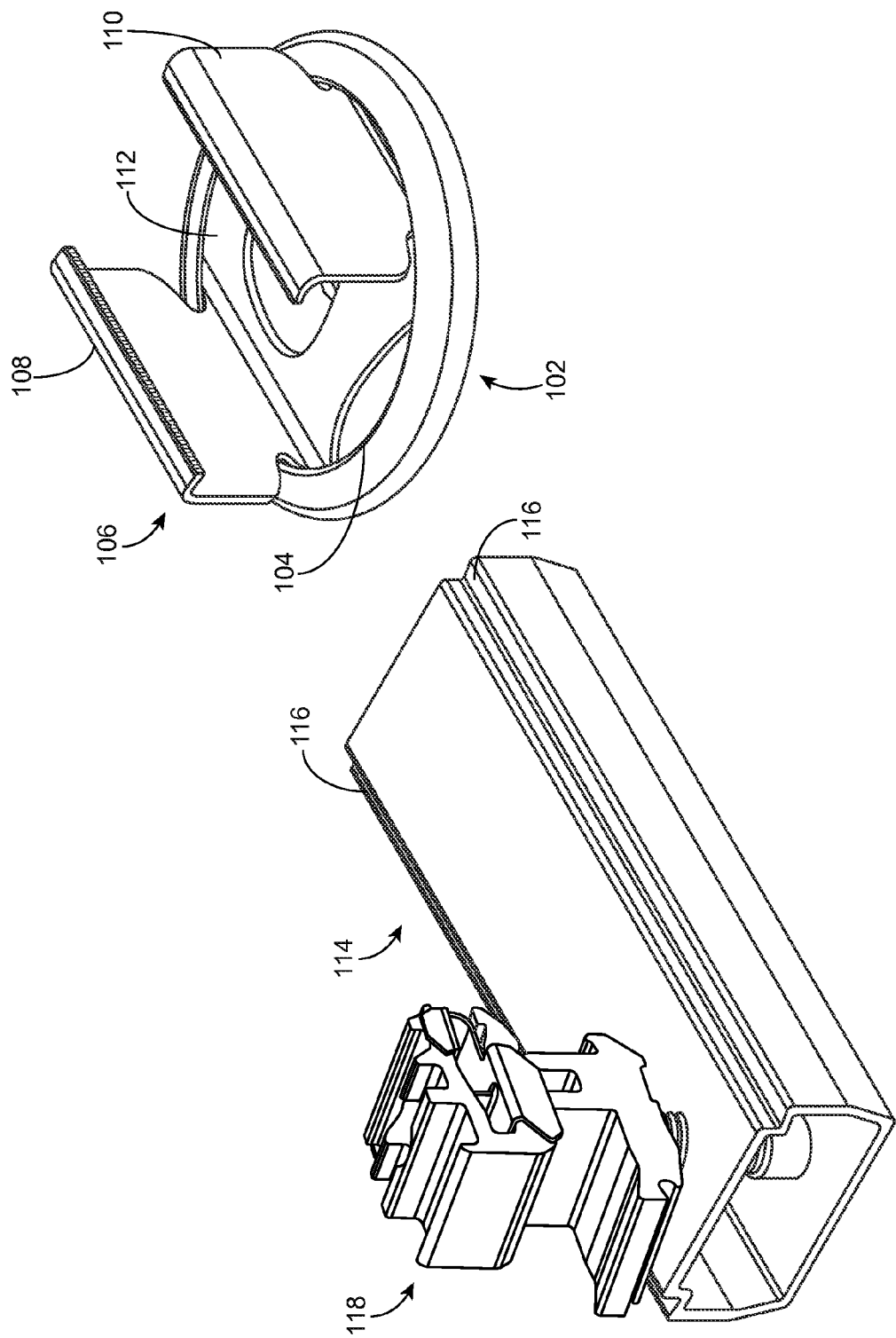

FIGS. 1A and 1B show perspective views of an exemplary system 100 for mounting a PV module to a structure, such as a roof. System 100 includes base portion 102, which here is formed as a puck having lip 104 that can curve inwardly. Base portion 102 has a lower roof-facing surface that is configured to directly or indirectly mount to a structure, and can include one or more passages for mounting base portion 102 via a lag bolt or other mechanical fastener. FIG. 1D, discussed in greater detail below, depicts an example of how base portion 102 can be aligned and mounted to a support structure. It should be appreciated that base portion 102 is not limited to the puck-like design illustrated in the figures. For example, inner lip 104 may be integrated into a flashing or specialized shingle to provide the functionality of the base portion 102 in a different form.

Figure 1C:
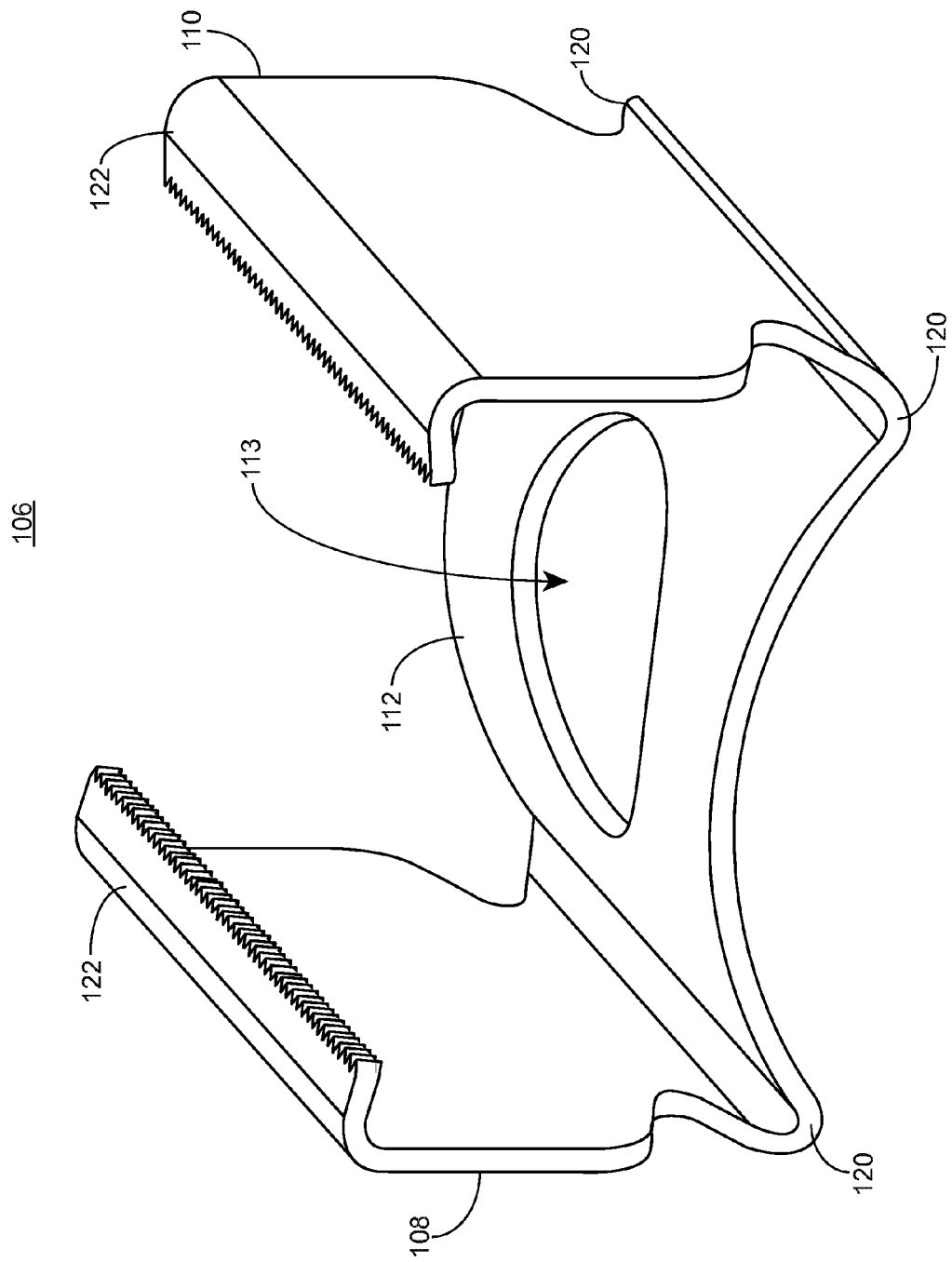
FIG. 1C shows a perspective view of an aspect of the system of FIG. 1A, according to an embodiment of the invention.
Figure 1D:
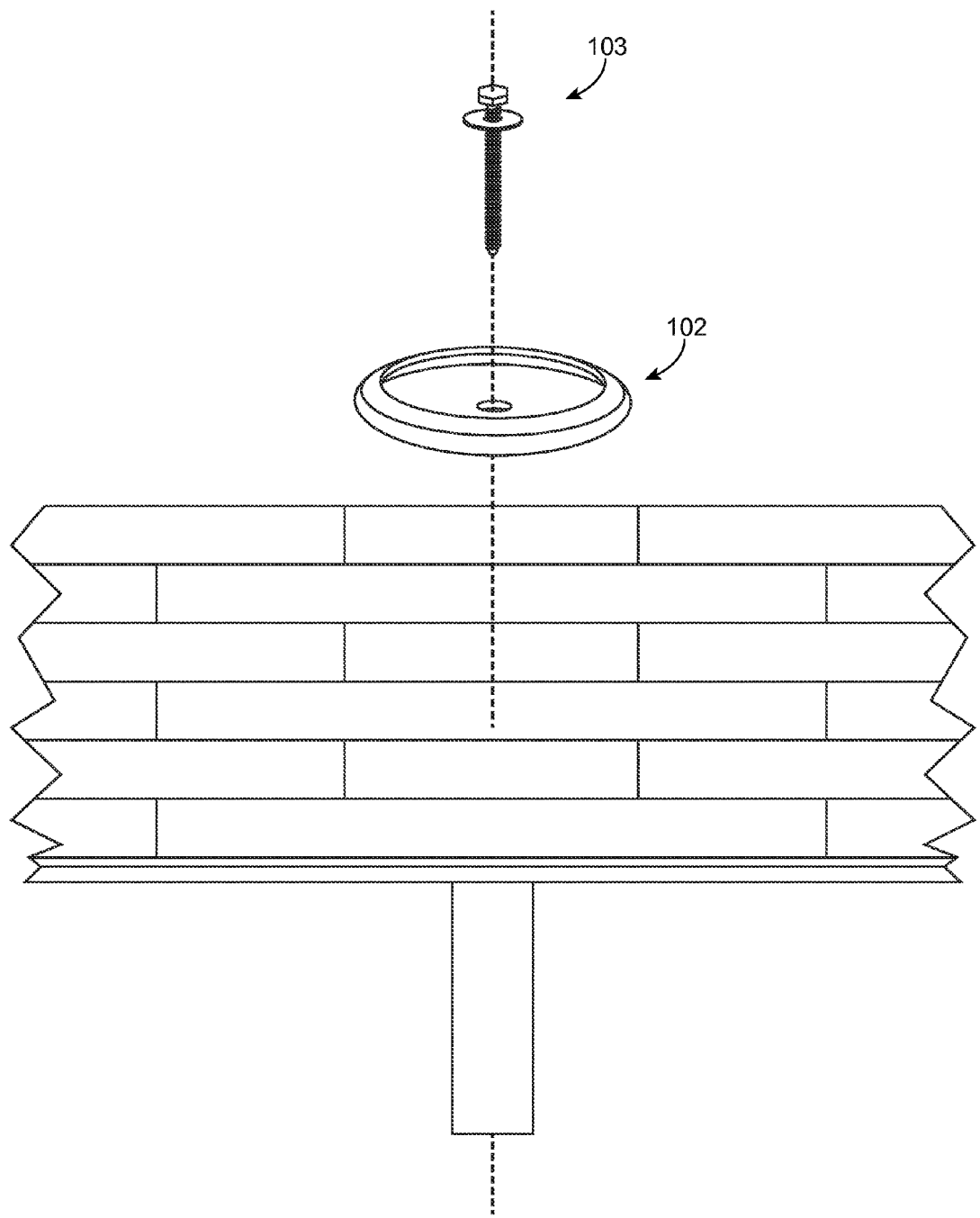
FIG. 1D shows an exploded view of an aspect of the system of FIG. 1A, according to an embodiment of the invention.

With continued reference to FIGS. 1A-C, clamp 106 extends upwardly from a PV module-facing side of base portion 102. In various embodiments, clamp 106 is a one-piece structure that may include first clamp portion 108 connected to second clamp portion 110 by spring base 112, which as shown at FIG. 1A forms a boxed structure that holds an elongated support beam 114. It should be appreciated, however, that in certain embodiments, spring base 112 might include a hinge or seam joining two pieces together to form clamp 106. Such a configuration may make it easier to install clamp 106 into base portion 102 while still providing the flexible functionality of a one-piece clamp. Clamp 106 may be formed of a roll formed steel or other semi-compressible, rust resistant material.

In the illustrated embodiment, elongated support beam 114 is configured as a rectangular tube having ledges 116 that fit under complimentary portions of clamp 106. Elongated support beam 114 in turn supports PV module coupling device 118 that is configured to couple together the frames of at least two photovoltaic modules. Elongated support beam 114 may also rest on lip 104 of base portion 102, as shown, for example, in FIGS. 1A and 2C.

As shown at FIG. 1C, each clamp portion also includes cut-outs at the corners that form corner portions 120 adapted to forcibly wedge within lip 104 of base portion 102. Retaining portions 122 of the clamp are configured to engage and bite into the ledges 116 of the elongated support beam. The retaining portions 122 of the clamp can include a textured edge, such as the teeth shown to help prevent lateral displacement of elongated support beam 114. As shown, the spring base 112 can be configured as an upward facing arch, which is resilient to downward deformation enacted by the elongated support beam 114, and includes a central passage to clear the head of a lag bolt or other fastener.

The PV module coupling device 114 shown in FIGS. 1A-B is a "rock-it" style connector manufactured by SolarCity Corp., which is arranged to connect to a groove formed in the frames of two adjacent PV modules. Such a coupling device is described and illustrated, for example, in commonly assigned U.S. patent application Ser. No. 14/615,320, Publication No. 2015/0155823-A1, the disclosure of which is herein incorporated by reference in its entirety. However, the system 100 is not limited to use of such a coupling device. A multitude of different styles of coupling devices are compatible with the system, such as, for example, coupling device 130 illustrated at FIG. 4, which depicts a clamping-style coupling device 130 with an upper and lower clamp arranged to clamp the top and bottom portions of a PV module. Such a clamping-style typically includes a top-facing bolt, screw or other fastener that enables an installer to compress the frame of a photovoltaic module between two clamping portions after placement.

Referring now to FIG. 1D, this figure illustrates a method for installing base portion 102 to a roof deck or roof surface using a mechanical fastener or lag bolt such as lag bolt 103. Lag bolt 103 may be installed through an opening formed in base portion 102 so as to penetrate the roof surface at a point over a roof rafter. This may be accomplished by drilling a pilot hole at the desired point in the roof over the roof rafter prior to lagging in lag bolt 103 through base 102. It should be appreciated that although there is only a single lag bolt hole in illustrated base portion 102, in various embodiments, it may be desirable to have two or more through-holes to permit more than one fastening point to the roof surface. Moreover, base portion 102 is not limited to the puck-like design illustrated in the figures. For example, inner lip 104 may be integrated into a flashing or specialized shingle to provide the functionality of base portion 102 in a different form. In some embodiments, base portion 102 may be installed first by itself and clamp 106 inserted into base portion 102 after base portion 102 has been lagged to the roof or other support surface. In other embodiments, clamp 106 and base portion 102 will come as a pre-assembled module. In such embodiments, opening 113 in the bottom of spring base 112 will provide access for drilling a pilot hole and any tools necessary to torque down the lag bolt. Because corner portions 120 and lip 104 keep clamp 106 attached to base portion 102, it is not necessary for the lag bolt to contact spring base 112.

Figure 2A:
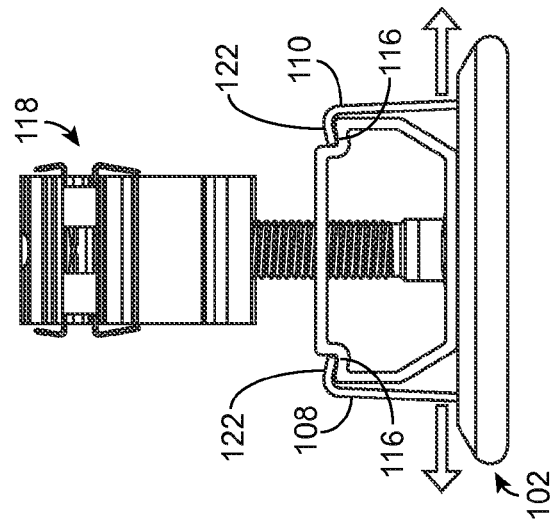
FIGS. 2A-2C show operational views of the system of FIG. 1A.
Figure 2B:
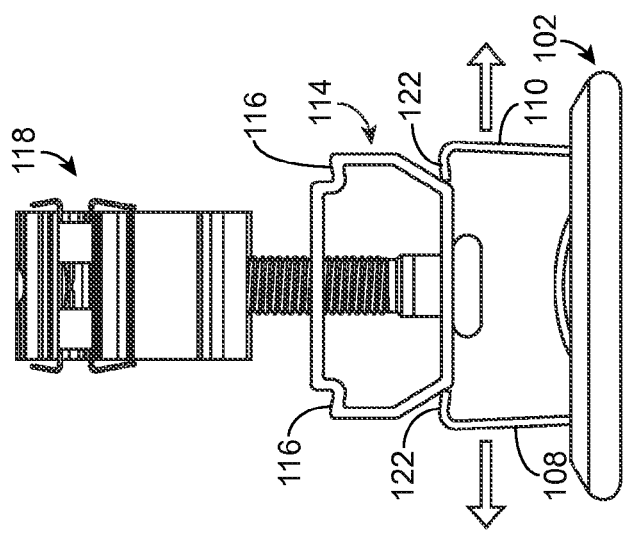
Figure 2C:
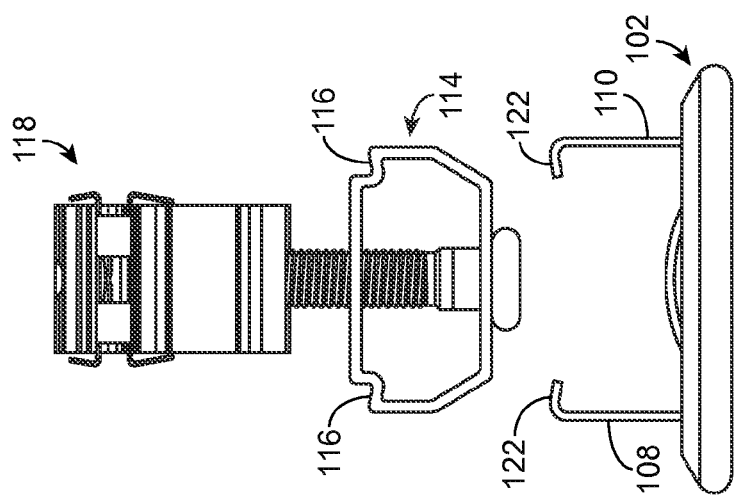

FIGS. 2A through 2C illustrate a tool-free and boltless operation for installing system 100 is shown at FIGS. 2A through 2C, after base portion 102 is pre-installed to a structure, such as a roof. At FIG. 2A, clamp 106 is arranged within base portion 102, and before placement of the elongated support beam 114. At FIG. 2B, elongated support beam 114 is then brought down between first clamp portion 108 and second clamp portion 110, and placed in a desired location with respect to placement of PV module coupling device 114. As indicated by the arrows, beveled lower surfaces of elongated support beam 114 act to apply an initial spreading force against first clamp portion 108 and second clamp portion 110.

At FIG. 2C, elongated support beam 114 is shown fully bared down into clamp 106, which in turn forms a boxed structure about elongated support beam 114. In some embodiments, this may be done after coupling device 118 has been attached to at least one PV module. In other embodiments, elongated support beam 114 may be installed The bottom of elongated support beam 114 resiliently deforms spring base 112, which causes corner portions 120 of clamp to wedge forcibly into lip 104 of base portion 102. In this position spring base 112 places a continuous force against the bottom of elongated support beam 114, and would eject elongated support beam 114 if not for retaining portions 122 of the clamp holding ledges 116 of elongated support beam 114. Support beam 114 may also rest on lip 104 after spring base 112 has been deformed to provide additional support. If placement of system 100 is incorrect, or if one of the PV modules being supported by coupling device 118 needs to be removed for any reason, an installer only needs to spread apart clamp 106 such that the ledges clear the retaining portions to release and raise elongated support beam 114, reposition elongated support beam 114 as desired, and then reapply the elongated support beam to clamp 106. Accordingly, system 100 provides a substantially tool-free and boltless method of installing and adjusting a PV module support device.

Figure 3:
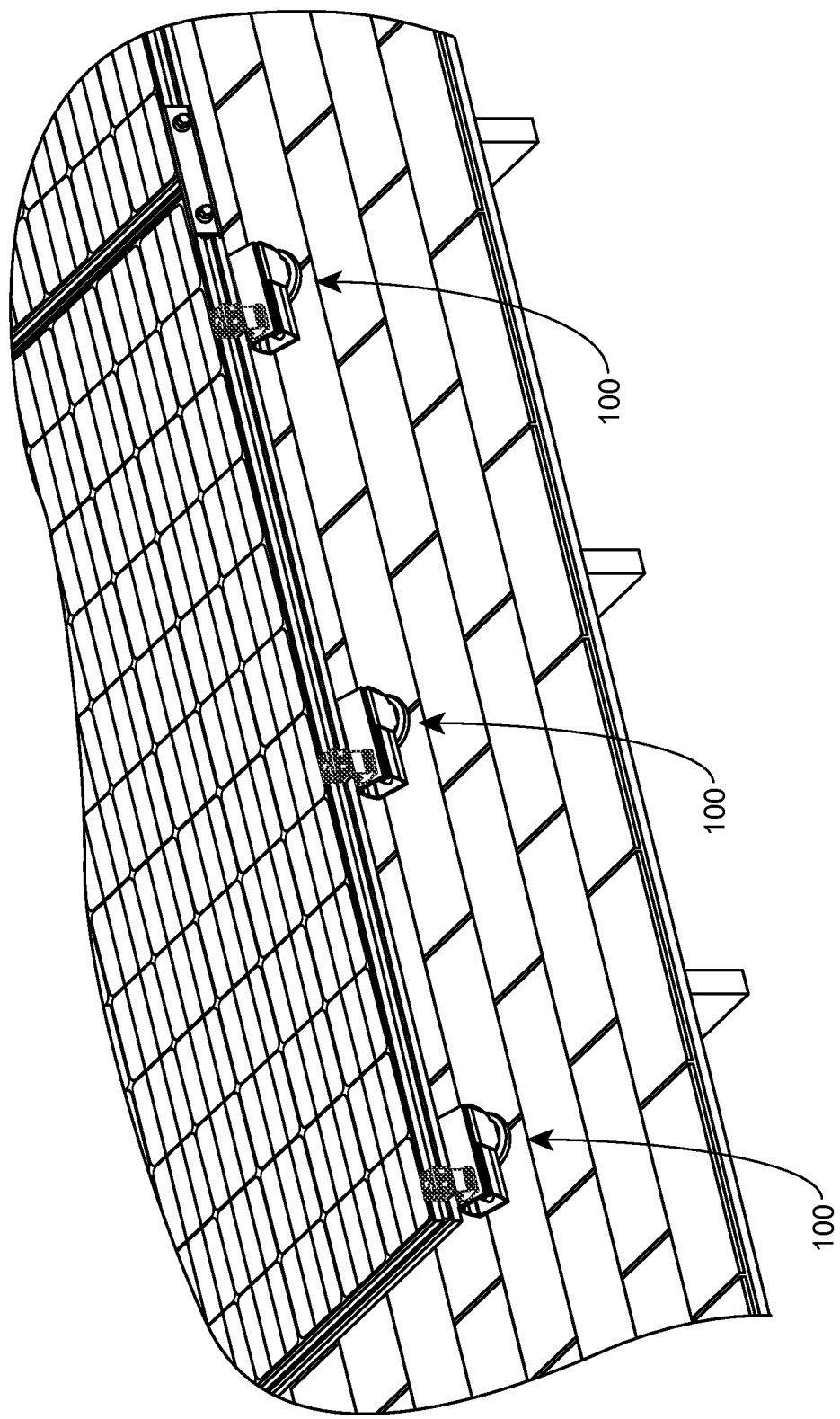
FIG. 3 shows the system of FIG. 1A in use, according to an embodiment of the invention.
Figure 4:
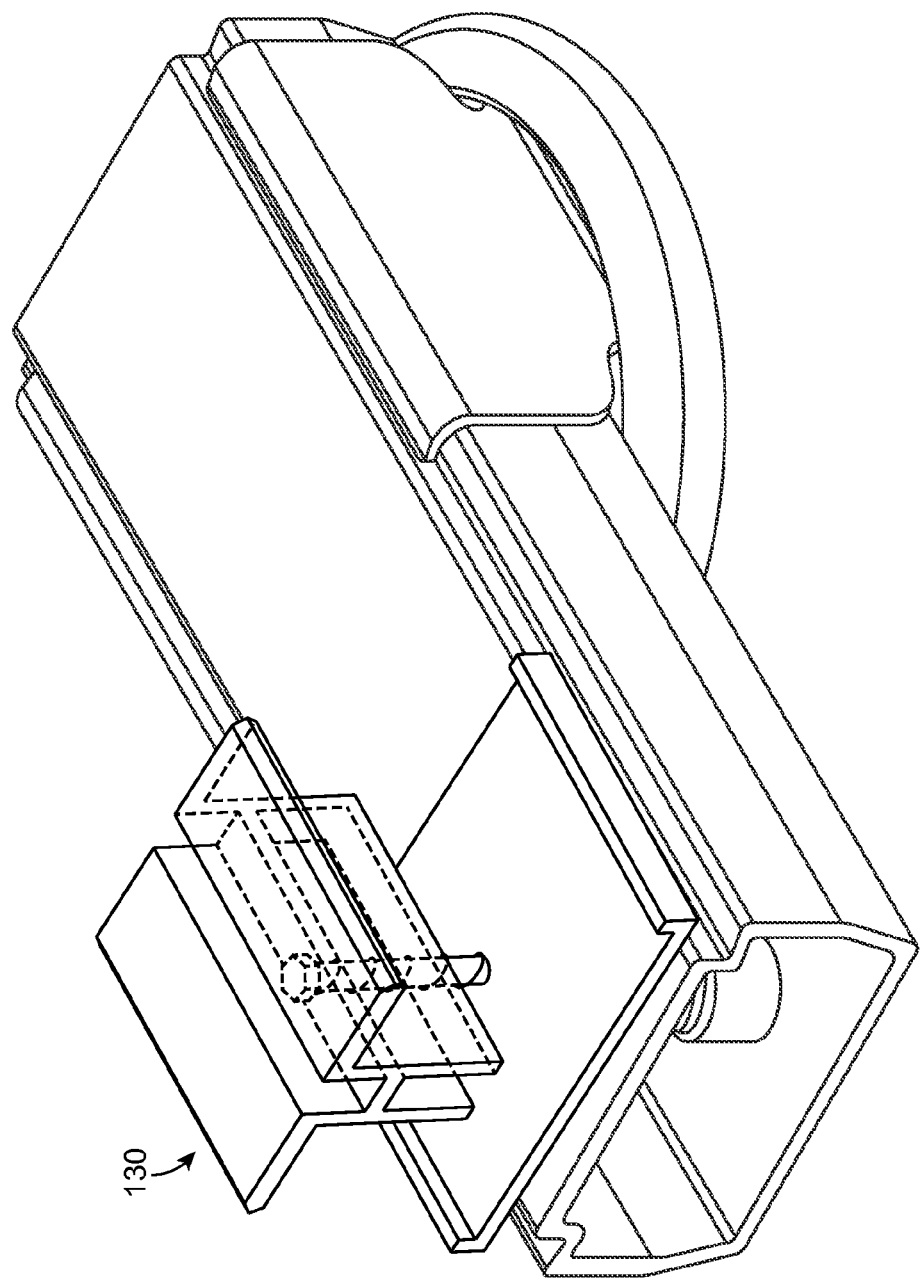
FIG. 4 shows a perspective view of another exemplary PV mounting system, according to an embodiment of the invention.

FIG. 3 shows a plurality of systems 100 mounted to a roof and supporting a plurality of PV modules. While system 100 is shown mounted to a sloped roof, system 100 can be used on a variety of alternative structures. Also, although in FIG. 3, three mounting systems 100 are shown supporting one side of a PV module, in some applications fewer or more mounting systems may be on each side of a PV module. Also, although the PV module illustrated in FIG. 3 is a grooved-frame module supported by a rock-it coupling device, in other embodiments, the PV module could have a standard non-grooved frame and the coupling device could be a clamping-style coupling device as illustrated in FIG. 4. Such modifications are within the spirit and scope of the invention.

Other variations are within the spirit and scope of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic (PV) mounting system comprising:
 a substantially planar base portion comprising a roof-facing surface configured to face a roof, and a module-facing surface, opposite the roof-facing surface, configured to face a photovoltaic module, wherein the base portion comprises a lip circumscribing a perimeter of the base portion and curving inward over the module-facing surface;
 a clamp comprising a spring base and a pair of clamping flanges extending upwardly from the spring base;
 a support beam comprising a pair of ledges engaged with retaining portions of the pair of clamping flanges of the clamp, wherein the support beam further comprises a bottom portion, wherein the bottom portion is in contact with and is supported by the lip, and wherein the bottom portion contacts and resiliently deforms the spring base spreading apart and wedging corner portions of the clamp between the lip and the module-facing surface attaching the clamp to the base portion; and a PV module coupling device mechanically coupled to the support beam and configured for coupling to a frame of the photovoltaic module.

2. The PV mounting system of claim 1, wherein the base portion comprises a circular puck having a through-hole configured for mounting the base portion to a structure by a mechanical fastener, and wherein the support beam overlaps the through-hole.

3. The PV mounting system of claim 1, wherein the spring base is flattened by the support beam.

4. The PV mounting system of claim 3, wherein the spring base applies a spring force urging the support beam against the retaining portions of the clamping flanges.

5. The PV mounting system of claim 1, wherein the clamping flanges form a boxed structure extending upwardly from the base portion.

6. The PV mounting system of claim 1, wherein the clamping flanges comprise teeth configured for gripping the support beam and preventing lateral displacement of the support beam relative to the clamp.

7. The PV mounting system of claim 1, wherein the photovoltaic module coupling device comprises a clamping-style connector.

8. The PV mounting system of claim 1, wherein the photovoltaic module coupling device comprises a rock-it connector.

9. A photovoltaic (PV) mounting system comprising:
a base portion comprising a module-facing surface and a lip curving inward over the module-facing surface;
a clamp comprising a spring base and a pair of clamping flanges; and
a support beam configured as a mount for a PV module coupling device,
wherein the support beam is positioned between the clamping flanges and the support beam contacts and resiliently deforms the spring base to cause the corner portions of the spring base to spread apart and be wedged between the lip and the module-facing surface.

10. The PV system of claim 9, wherein the base portion comprises a circular puck adapted to mount to a structure via a mechanical fastener.

11. The PV system of claim 9, wherein the pair of clamping flanges comprises a boxed structure for holding the support beam.

12. The PV system of claim 9, wherein the spring base urges the support beam away from the base portion and wherein the pair of clamping flanges comprises a pair of ledges that maintain the support beam in position to resiliently deform the spring base.

13. The PV system of claim 9, wherein the pair of clamping flanges comprises teeth engaging the support beam and preventing lateral displacement of the support beam relative to the clamp.

14. The PV system of claim 9, wherein the support beam comprises an elongated boxed beam.

15. A photovoltaic (PV) mounting system comprising:
a base portion comprising a module-facing surface and a lip curving inward over the module-facing surface;
a clamp comprising a spring base formed as a spring, wherein the spring base is in contact with the module-facing surface; and
a support beam configured as a mount for a PV module coupling device, wherein the support beam is held within the clamp and contacts the spring base, and wherein the clamp is locked to the base portion with corner portions of the spring base being wedged between the lip and the module-facing surface without the use of separate mechanical fasteners.

16. The PV system of claim 15, wherein the clamp comprises flanges that extend upwardly from the spring base of the clamp.

17. The PV system of claim 15, wherein the spring base of the clamp comprises an arch.

18. The PV system of claim 17, wherein the arch is contacted by and flattened by the support beam when the base of the clamp is locked in to the base portion.

19. The PV system of claim 18, wherein the clamp includes retaining portions engaged with the support beam for maintaining resilient compression of the arch by the support beam.

* * * * *